(12) United States Patent
Kaneko

(10) Patent No.: US 9,944,129 B2
(45) Date of Patent: Apr. 17, 2018

(54) TREAD COMPRISING SCULPTED ELEMENTS COMPRISING A COVERING LAYER

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Shuichi Kaneko, Tokyo (JP)

(73) Assignees: Compagnie Generale des Etablissements Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 305 days.

(21) Appl. No.: 14/655,165

(22) PCT Filed: Nov. 29, 2013

(86) PCT No.: PCT/EP2013/075130
§ 371 (c)(1),
(2) Date: Jun. 24, 2015

(87) PCT Pub. No.: WO2014/102039
PCT Pub. Date: Jul. 3, 2014

(65) Prior Publication Data
US 2015/0343851 A1 Dec. 3, 2015

(30) Foreign Application Priority Data
Dec. 28, 2012 (FR) ...................................... 12 62924

(51) Int. Cl.
*B60C 11/00* (2006.01)
*B60C 11/13* (2006.01)

(52) U.S. Cl.
CPC ........ *B60C 11/1307* (2013.01); *B60C 11/005* (2013.01); *B60C 11/1346* (2013.01); *B60C 2011/133* (2013.01)

(58) Field of Classification Search
CPC ........... B60C 11/1346; B60C 2011/133; B60C 11/1307
See application file for complete search history.

(56) References Cited

U.S. PATENT DOCUMENTS 3,462,328 A 8/1969 Buckland
5,031,680 A * 7/1991 Kajikawa ................ B60C 11/11
152/209.18
(Continued)

FOREIGN PATENT DOCUMENTS

JP 02-249707 A * 10/1990
JP 05-147412 A 6/1993
(Continued)

OTHER PUBLICATIONS

Translation for Japan 02-249707 (no date).*
International Search Report for PCT/EP2013/075130 dated Feb. 28, 2014.

*Primary Examiner* — Steven D Maki
(74) *Attorney, Agent, or Firm* — Dickinson Wright, PLLC

(57) ABSTRACT

A tread made of rubber material for a snow tire having a tread surface intended to be in contact with a road surface when the tire is being driven on, and provided with a plurality of cuts delimited by walls situated facing one another and forming lateral walls of raised elements of the tread. Each lateral wall intersects the tread surface to form an edge corner. At least one lateral wall of a raised element is formed partially or fully by a cover layer extending from the edge corner associated with this lateral wall, of a material having an elastic modulus higher than that of the rubber material of the tread. The raised element has a (Continued)

depression in its lateral wall, delimited by the cover layer. The raised element moreover has a width W and the depth P of the depression is at least equal to 10% of the width W of the element and less than or equal to 40% of this width W. Finally the volume of the depression is less than 10% of the volume of the raised element.

4 Claims, 5 Drawing Sheets

(56) References Cited

U.S. PATENT DOCUMENTS

| | | | |
|---|---|---|---|
| 5,840,137 A | | 11/1998 | Futamura |
| 6,668,886 B1 * | | 12/2003 | Iwamura .................. B60C 11/12 152/209.18 |
| 2012/0273105 A1 * | | 11/2012 | Ducci ..................... B60C 11/13 152/209.18 |

FOREIGN PATENT DOCUMENTS

| | | |
|---|---|---|
| JP | H09150607 A | 6/1997 |
| JP | 2001-294022 A | 10/2001 |
| JP | 2007182160 A | 7/2007 |
| JP | 2009-179292 A | 8/2009 |
| JP | 2009-292229 A | 12/2009 |

\* cited by examiner

TREAD COMPRISING SCULPTED ELEMENTS COMPRISING A COVERING LAYER

This application is a 371 national phase entry of PCT/EP2013/075130, filed 29 Nov. 2013, which claims benefit of French Patent Application No. 1262924, filed 28 Dec. 2012, the entire contents of which are incorporated herein by reference for all purposes.

BACKGROUND

Field

The present disclosure relates to a tread for a tire intended for winter driving.

Description of Related Art

A tire for winter driving, known as a snow tire, needs to have sufficient grip both on a snowy road surface and on an icy road surface. However, on these different types of ground, the way in which the tread works to achieve good grip differ and can even counter one another. On a snowy road surface attempts will be made to "claw at" the snow by creating raised pressures in specific zones of the tread. On an icy road surface the aim is to obtain the highest and most uniform possible contact pressure with the road surface.

Document U.S. Pat. No. 5,840,137 discloses a tread comprising a plurality of grooves delimited by walls. These walls are formed by a cover layer containing a material that differs from the rubber material of which the tread is made. More specifically, the material of the layer here has a mean glass transition temperature (Tg) which is lower than that of the rubber material, thus making it more rigid. Thanks to this rigidity, it can more easily claw at the snow on the snowy road surface and therefore very greatly improve the grip on this snowy road surface. However, the inventors have observed that the tread of document U.S. Pat. No. 5,840,137 does not make it possible to improve to the same extent the level of grip on an icy road surface. This tread therefore exhibits a not insignificant imbalance between, on the one hand, its performance on a snowy road surface and, on the other hand, its performance on an icy road surface.

There is therefore a need to create a tire tread that affords a better compromise between grip on a snowy road surface and grip on an icy road surface, while at the same time maintaining a very high level of grip on this snowy road surface.

DEFINITIONS

A "tire" means all types of elastic tire covering, whether or not they are subjected to an internal pressure.

A "snow tire" or "winter tire" means a tire identified by an inscription M+S or M.S. or even M&S, marked on at least one of the sidewalls of the tire.

The "tread" of a tire means a quantity of rubber material delimited by lateral surfaces and by two main surfaces, one of which is intended to come into contact with road surface when the tire is being driven on.

The "tread surface" of a tread means the surface formed by those points of the tread of the tire that come into contact with the road surface when the tire is being driven on.

A "cut" means either a groove or a sipe. More specifically, a cut corresponds to the space delimited by the walls of material that face one another and are distant from one another by a non-zero distance. What differentiates a sipe from a groove is the magnitude of this distance; in the case of a sipe, this distance is appropriate for allowing the opposite walls to come into contact as that region passes through the contact patch in which the type is in contact with the road surface. In the case of a sipe, this distance here is at most equal to two millimeters (mm). In the case of a groove, the walls of this groove cannot come into contact with one another under normal running conditions.

A "raised element" in a tread means a rubber element that protrudes in this tread.

SUMMARY

The invention, in an embodiment, relates to a tread made of rubber material for a snow tire. This tire comprises a tread surface intended to be in contact with a road surface when the tire is being driven on. This tread is provided with a plurality of cuts delimited by walls situated facing one another and forming lateral walls of raised elements of the tread. Each of these lateral walls opens onto the tread surface to form an edge corner. At least one lateral wall of a raised element is formed partially or fully by a cover layer extending from the edge corner associated with this lateral wall. This material has an elastic modulus higher than the elastic modulus of the rubber material of which the tread is made. The raised element comprises a depression in its lateral wall, this depression being delimited by the cover layer. With the raised element having a width W, the depth P of the depression is at least equal to 10% of the width W of the element and less than or equal to 40% of this width W. The volume of the depression is less than 10% of the volume of the raised element.

In the first moments of contact between the moulding element and the road surface, the moulding element compresses, and this will partially or completely close up the depression. The depression makes it possible to improve grip on an icy road surface without excessively impairing grip on a snowy road surface, the cover layer situated near the edge corner of the moulding element still allowing effective "clawing at" the snow.

It will also be noted that the depression has limited dimensions in comparison with the moulding element, making it possible to avoid any weakening of this moulding element.

In one preferred embodiment, the cover layer does not extend beyond the depression.

Thus, the upper part of the lateral wall will be made to flex more significantly because it is not covered with a cover layer. This flexing is also improved by the presence of the cover material in the depression. The distribution of pressure through the moulding element will therefore be more uniform and the grip on an icy road surface improved.

In another preferred embodiment, the depression, when viewed in cross section, has a triangular shape pointing in the raised element in a direction away from the edge corner.

The depression is formed by a projecting mould element. By proposing a depression with a triangular shape pointing in a direction away from the edge corner, release from the mould element that moulds this depression becomes easier.

In an alternative form of embodiment, the depression opens onto the tread surface of the tread, the cover layer delimiting this depression making an angle of less than 90° with this tread surface.

By providing such an angle at the edge corner of the lateral wall, the ability of the tread to "claw at" the snow is improved.

In an alternative form of embodiment, the raised element comprises two depressions opening respectively onto two opposite lateral walls of this element.

With depressions present in two opposite lateral walls of the raised element, the grip of the tire is improved both under vehicle acceleration and under braking.

BRIEF DESCRIPTION OF THE DRAWINGS

Other features and advantages of the invention will emerge from the following description, given by way of nonlimiting example, with reference to the attached drawings in which.

In the description that follows, elements that are substantially identical or similar will be denoted by identical references.

DETAILED DESCRIPTION OF SPECIFIC EMBODIMENTS

Figure 1:
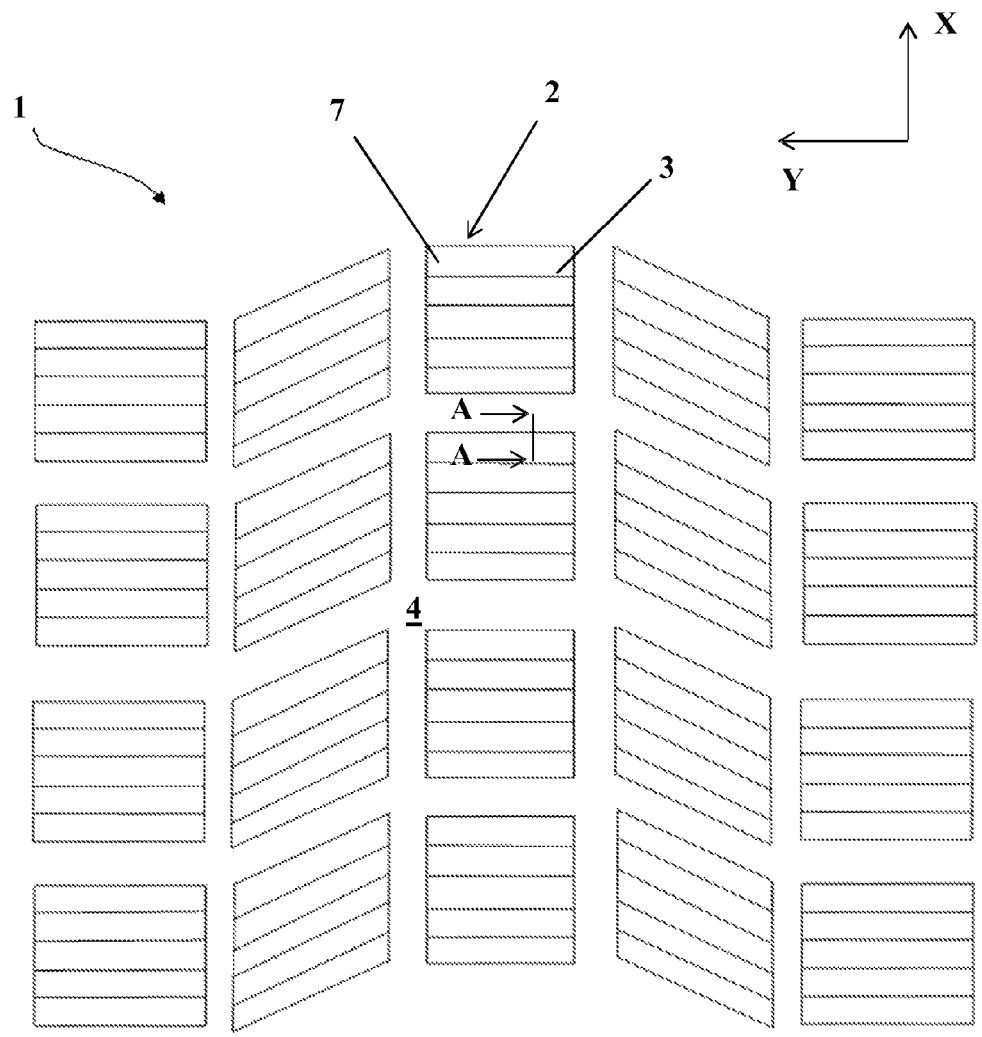
FIG. 1 depicts a schematic diagram of part of a tread according to embodiments of the invention.

FIG. 1 depicts part of a tread 1 of a snow tire. This tread comprises a plurality of raised blocks 2 of rubber organized to form the tread pattern of this tread. The blocks of rubber 2 are delimited by grooves 4 which may extend in an axial direction Y parallel to the axis of rotation of the tire, in a circumferential direction X perpendicular to the axial direction Y, or in an oblique direction that has both a non-zero circumferential component and a non-zero axial component. Each block of rubber 2 is in this instance divided into a plurality of strips of rubber 7 separated by sipes 3.

Figure 2:
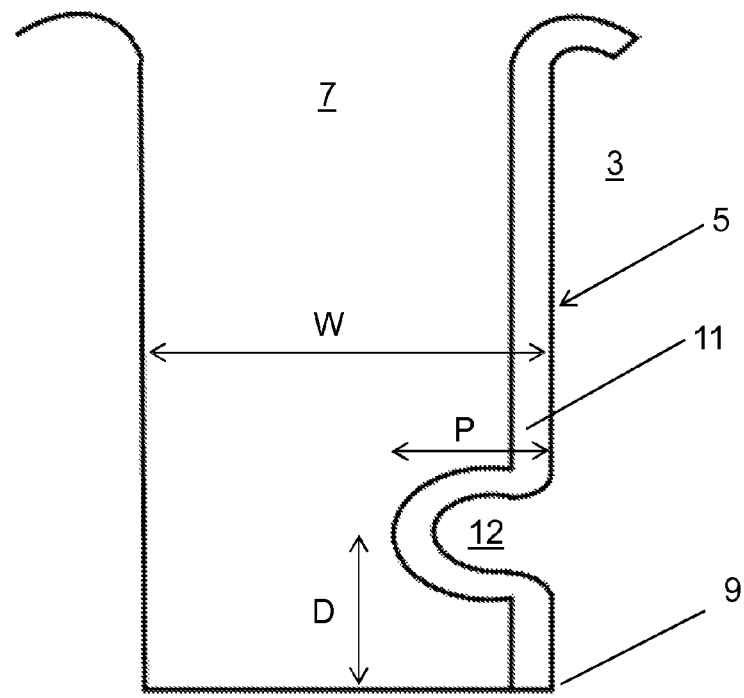
FIG. 2 depicts, viewed in cross section, a raised element of the tread of FIG. 1 according to a first embodiment of the invention, in a state of rest.

FIG. 2 is a view of a strip 7 in cross section on A-A of the tread visible in FIG. 1, according to a first embodiment of the invention. The strip 7 here comprises a lateral wall 5 formed by a cover layer 11. This layer 11 extends here from the edge corner 9 as far as the bottom of the sipe 3 that delimits the strip 7. The strip 7 also comprises a depression 12 delimited by the cover layer 11. This depression 12 is located with respect to the edge corner 9 at a distance D less than ⅔ of the height H of the strip 7. As an alternative, the depression 12 is situated with respect to the edge corner 9 at a distance D of less than half this height H. In addition, it will be noted that the depth P of the depression is at least equal to 10% of the width W of the strip 7 and less than or equal to 40% of this width W. The volume of the depression is itself less than 10% of the volume of the strip 7.

The cover layer 11 here has an elastic modulus higher than the elastic modulus of the rubber material of which the tread 1 is made. Such a material is, for example, an elastomeric material of which the dynamic shear modulus G★ subjected to a maximum alternating stress of 0.7 MPa, at a frequency of 10 Hz and at a temperature of −10°, is higher than 200 MPa and preferably higher than 300 MPa. In this document, the terms "elastic modulus G'" and "viscous modulus G''" refer to dynamic properties well known to those skilled in the art. These properties are measured on a Metravib VA4000 viscoanalyzer using test specimens moulded from uncured compositions. Test specimens such as those described in the standard ASTM D 5992-96 (the version published in September 2006, initially approved in 1996), Figure X2.1 (circular embodiment) are used. The diameter of the test specimen is 10 mm (it therefore has a circular cross section of 78.5 mm$^2$), the thickness of each of the portions of rubber composition is 2 mm, giving a "diameter-to-thickness" ratio of 5 (in contrast with standard ISO 2856 mentioned in paragraph X2.4 of the ASTM standard, which recommends a d/L value of 2). The response of a test specimen of vulcanized rubber compound subjected to simple alternating sinusoidal stresses at a frequency of 10 Hz is recorded. The test specimen is loaded in sinusoidal shear at 10 Hz, with the applied load (0.7 MPa) applied symmetrically about its position of equilibrium. Measurements are taken over a temperature gradient with the temperature increasing by 1.5° C. per minute, from a temperature Tmin below the glass transition temperature (Tg) of the material up to a temperature Tmax which may correspond to the rubber platen of the material. Before the sweep is begun, the test specimen is stabilized at the temperature Tmin for 20 minutes in order to achieve a uniform temperature within the test specimen. The result exploited is the dynamic shear elastic modulus (G') and the viscous shear modulus (G'') at the chosen temperatures (in this instance 0°, 5° and 20° C.). The "complex modulus" G★ is defined as the absolute value of the complex sum of the elastic modulus G' and the viscous modulus G'': $G^* = \sqrt{(G'^2 + G''^2)}$.

In an alternative form of embodiment, the elastomeric material of the cover layer contains a composition based on at least one diene elastomer with a very high sulphur content, such as ebonite.

In another alternative form of embodiment, the cover layer contains a collection of fibers, for example a three-dimensional collection of fibers forming a felt. The fibers of this felt may be selected from the group consisting of textile fibers, mineral fibers and mixtures thereof. It will also be noted that the fibers in this felt may be selected from textile fibers of natural origin, for example from the group consisting of silk, cotton, bamboo, cellulose and wool fibers and mixtures thereof.

In another alternative form of embodiment, the elastomeric material of the cover layer contains a composition based on at least one thermoplastic polymer, such as polyethylene terephthalate (PET). Such a polymer may have a Young's modulus higher than 1 GPa.

Figure 3:
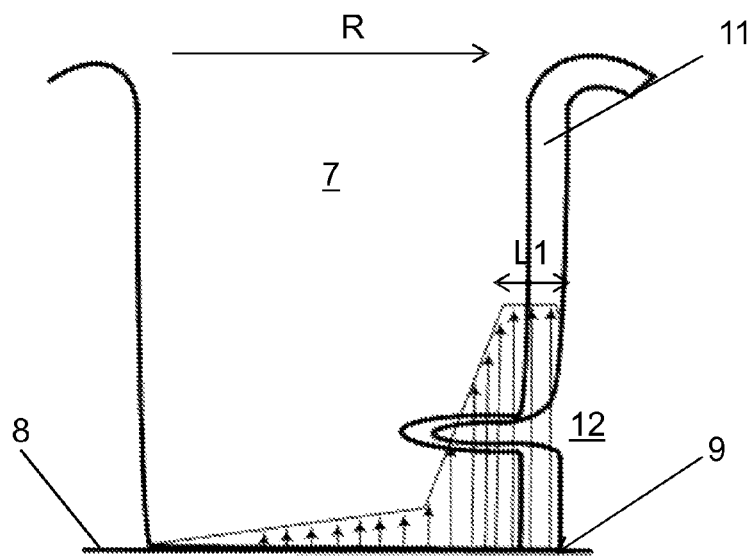
FIG. 3 depicts the raised element of FIG. 2 in contact with an icy road surface.

FIG. 3 depicts the strip 7 of FIG. 2 when this strip is loaded and in contact with an icy road surface 8. In this state, the depression 12 partially or completely closes. The extent to which this depression closes up depends on the load applied to the strip 7, on the material used in the layer 11, and on the type of road surface, snowy or icy, with which the strip 7 comes into contact.

The distribution of load applied to the strip 7 is also indicated. This is the example in which the strip 7 is moving past the road surface in a direction of rotation R with the vehicle accelerating, i.e. with the edge corner 9 of the strip 7 being first to come into contact with the road surface 8. The pressure applied by the road surface 8 on the strip 7 is at its maximum near the edge corner 9 and this maximum pressure extends over a width L1.

Figure 4:
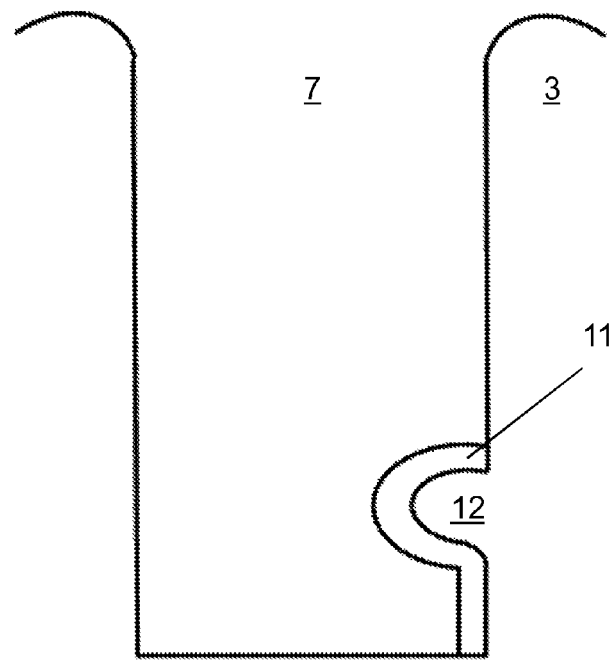
FIG. 4 depicts a raised element according to a second embodiment.

FIG. 4 is a view of the strip 7 in cross section according to a second embodiment of the invention. In this embodiment, the cover layer 11 does not extend beyond the depression 12, i.e. the layer 11 is not present in the bottom of the sipe 3 that delimits the strip 7.

Figure 5:
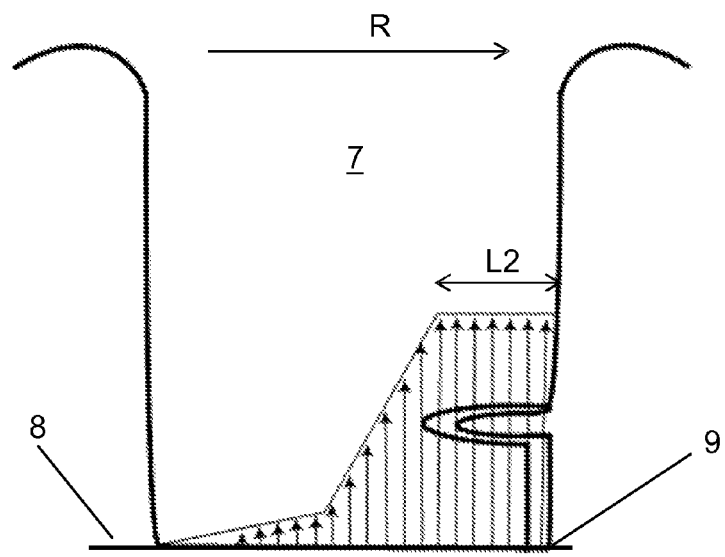
FIG. 5 depicts the raised element of FIG. 4 in contact with an icy road surface.

FIG. 5 depicts the strip 7 of FIG. 4 when this strip is loaded and in contact with the icy road surface 8. The inventors then discovered that the pressure applied by the road surface 8 on the strip 7 is at its maximum near the edge corner 9 and this maximum pressure extends over a width L2 greater than the width L1 of FIG. 3. Thus the grip of the tire on the icy road surface 8 is improved. Again, this is the example in which the strip 7 is moving past the road surface in a direction of rotation R with the vehicle accelerating, i.e. it is the edge corner 9 of the strip 7 that is first to come into contact with the road surface 8.

Figure 6:
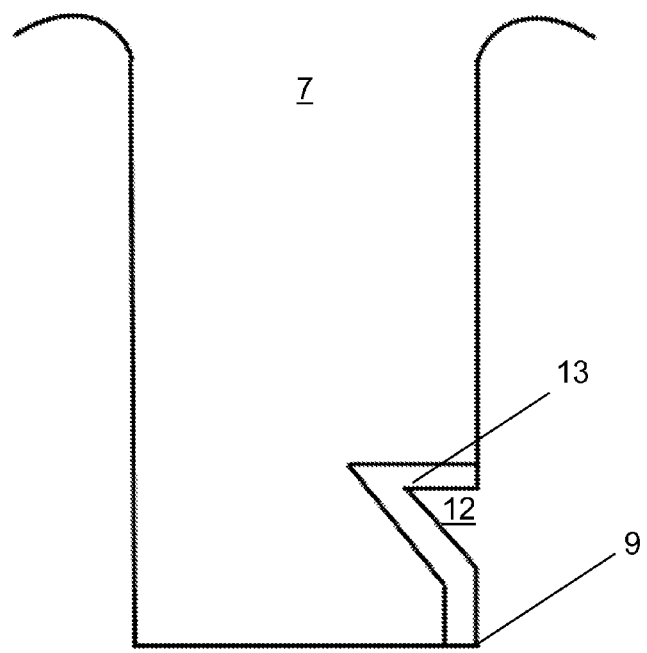
FIG. 6 depicts a raised element according to a third embodiment.

FIG. 6 depicts a third embodiment of the invention, in which the depression 12 has a triangular shape with a point 13 pointing away from the edge corner 9.

Figure 7:
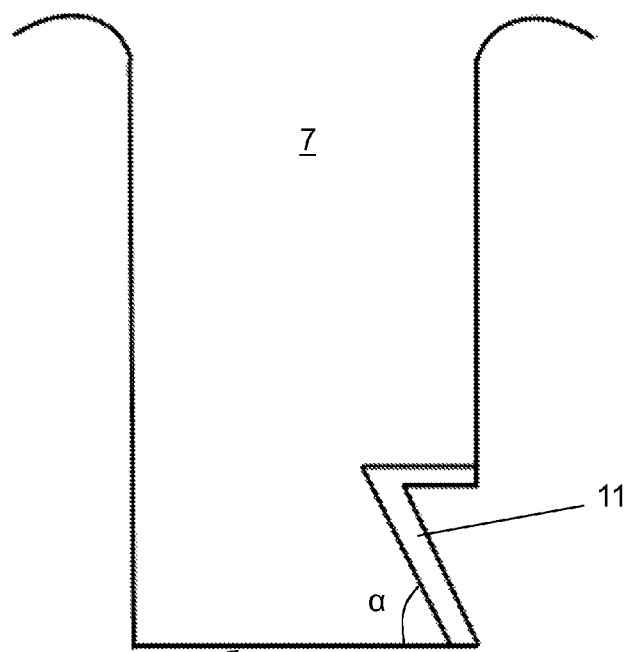
FIG. 7 depicts a raised element according to a fourth embodiment.

FIG. 7 depicts a fourth embodiment of the invention, in which the depression 12 opens onto the tread surface 15 of the tread. The cover layer 11 then makes an angle α of less than 90° with this tread surface.

Figure 8:
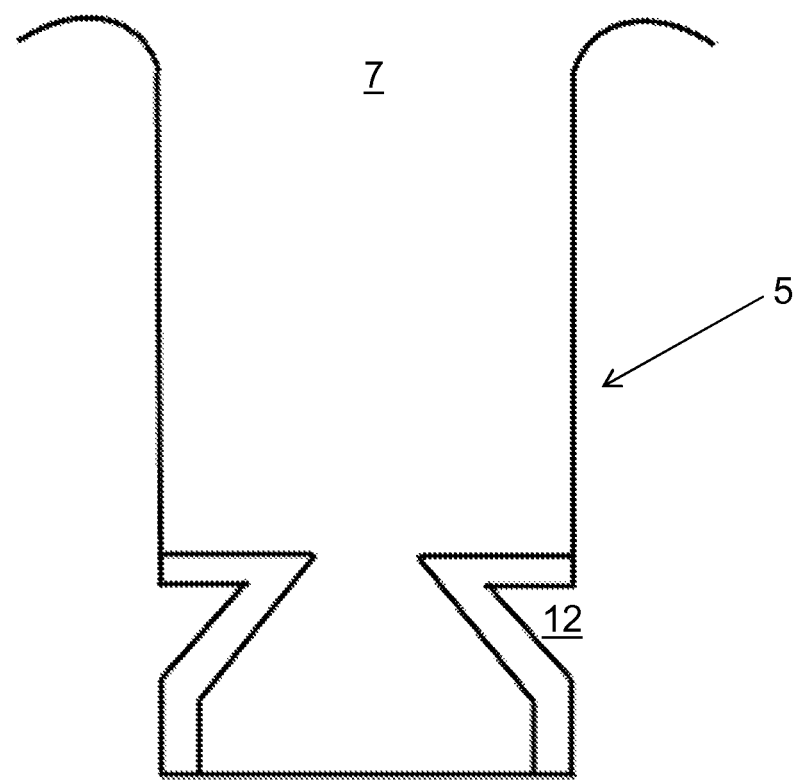
FIG. 8 depicts a raised element according to a fifth embodiment.

FIG. 8 depicts a fifth embodiment of the invention, in which the strip 7 has two depressions 12 opening respectively onto two opposite lateral walls 5 of the strip 7.

The invention is not restricted to the examples described and depicted and various modifications can be made thereto without departing from its scope.

The invention claimed is:

1. A tread made of rubber material for a snow tire comprising:
   a tread surface adapted to be in contact with a road surface when the tire is being driven on,
   a plurality of cuts delimited by walls situated facing one another and forming lateral walls of raised elements of the tread, each of the said lateral walls intersecting the tread surface to form an edge corner,
   wherein at least one lateral wall of a raised element is formed partially or fully by a cover layer extending from the edge corner associated with this lateral wall,
   wherein the material of this cover layer has an elastic modulus higher than an elastic modulus of the rubber material of which the tread is made,
   wherein the raised element comprises, in its lateral wall, a depression of depth P, this depression being delimited by the cover layer,
   wherein with the raised element having a width W, the depth P of the depression is at least equal to 10% of the width W of the element and less than or equal to 40% of this width W,
   wherein the volume of the depression is less than 10% of the volume of the raised element, and
   wherein the cover layer does not extend beyond the depression.

2. The tread according to claim 1, wherein the depression, when viewed in cross section, has a triangular form pointing in the raised element in a direction away from the edge corner.

3. The tread according to claim 1, wherein the depression opens onto the tread surface of the tread, the cover layer delimiting this depression making an angle (α) of less than 90° with this tread surface.

4. The tread according to claim 1, wherein the raised element comprises two depressions opening respectively onto two opposite lateral walls of this element.

* * * * *